(12) United States Patent
Wu et al.

(10) Patent No.: US 10,309,822 B2
(45) Date of Patent: Jun. 4, 2019

(54) MAGNETIC LEVEL INDICATOR

(71) Applicant: FINETEK Co., Ltd., New Taipei (TW)

(72) Inventors: Ting-Kuo Wu, New Taipei (TW); Chih-Wen Wang, New Taipei (TW); Yoyen Luo, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 214 days.

(21) Appl. No.: 15/407,008

(22) Filed: Jan. 16, 2017

(65) Prior Publication Data
US 2018/0202854 A1    Jul. 19, 2018

(51) Int. Cl.
*G01F 23/74* (2006.01)
*G01F 23/00* (2006.01)
*G01F 23/72* (2006.01)
*G01F 23/76* (2006.01)

(52) U.S. Cl.
CPC .......... *G01F 23/74* (2013.01); *G01F 23/0046* (2013.01); *G01F 23/72* (2013.01); *G01F 23/76* (2013.01)

(58) Field of Classification Search
CPC ........... G01F 23/74; G01F 23/72; G01F 23/00
See application file for complete search history.

(56) References Cited

U.S. PATENT DOCUMENTS

| | | | | |
|---|---|---|---|---|
| 4,512,190 A | * | 4/1985 | Sledmere | G01F 23/72 335/302 |
| 5,355,868 A | * | 10/1994 | Haen | A47J 37/0704 126/153 |
| 6,435,026 B1 | * | 8/2002 | Donehue | G01F 23/74 73/314 |
| 2015/0253179 A1 | * | 9/2015 | Carlson | G01F 23/72 116/204 |
| 2018/0120143 A1 | * | 5/2018 | Sato | G01F 23/62 |

* cited by examiner

*Primary Examiner* — David Z Huang
(74) *Attorney, Agent, or Firm* — Chun-Ming Shih; HDLS IPR Services

(57) ABSTRACT

A magnetic level indicator includes a fixed base and a plurality of magnetic elements. The fixed base includes two lateral plates corresponding to each other, a block portion extending from a bottom edge of each of the two lateral plates and an installation space between the two lateral plates. The magnetic elements are pivotally arranged in the installation space and are arranged along an extension direction of each lateral plate. Each of the magnetic elements includes a first surface and a second surface corresponding to each other and includes two stop plates placed corresponding to each other between the first surface and the second surface. The first surface includes a first indication mark, and the second surface includes a second indication mark different from the first indication mark.

11 Claims, 7 Drawing Sheets

MAGNETIC LEVEL INDICATOR

TECHNICAL FIELD

The present invention relates to a liquid indicator and, in particular, to a magnetic liquid indicator.

BACKGROUND

A magnetic level indicator is a level gauge which is disposed at one side of a liquid tank and indicates a liquid level by means of magnetic attraction.

The conventional magnetic level indicator includes a magnetic float, a hollow pipe and a level indication device. The magnetic float is disposed inside the hollow pipe, and the hollow pipe is disposed at one side of the liquid tank and communicates with the liquid tank. The level indication device is disposed at one side of the hollow pipe and includes a plurality of magnetic boards (having two colors for example) rotatable by magnetic attraction of the magnetic float. Therefore, when the magnetic float moves along with the liquid level of the liquid tank, the magnetic board is rotated by magnetic attraction to show an indication mark and to thereby indicate the liquid level of the liquid tank.

However, when the magnetic level indicator is in use, the magnetic float may move too fast at times, which causes excessive rotation of some magnetic boards and thereby causes wrong indication marks shown by the magnetic boards. Accordingly, the target of the inventor is to solve the above-mentioned problems, on the basis of which the present invention is accomplished.

SUMMARY

It is an object of the present invention to provide a magnetic level indicator for visual indication of a liquid level.

Accordingly, the present provides a magnetic level indicator which includes a fixed base and a plurality of magnetic elements. The fixed base includes two lateral plates corresponding to each other. A block portion extends from a bottom edge of each of the two lateral plates, and an installation space is formed between the two lateral plates. The magnetic elements are pivotally disposed in the installation space and are arranged longitudinally along an extension direction of each lateral plate. Each of the magnetic elements includes a first surface and a second surface corresponding to each other, and includes two stop plates disposed corresponding to each other between the first surface and the second surface. The first surface includes a first indication mark, and the second surface includes a second indication mark different from the first indication mark. When the magnetic float is close to the magnetic element, each magnetic element is rotated by magnetic attraction of the magnetic float to expose the first surface, and the stop plate is blocked by the block portion to avoid excessive rotation which would cause the second surface to be exposed.

Compared with conventional techniques, the magnetic level indicator of the present invention has the block portion extending from the bottom edge of each of the two lateral plates of the fixed base. Furthermore, the magnetic element includes two stop plates between the opposed first and second surfaces. Accordingly, when the magnetic float is close to the magnetic element, each magnetic element is rotated to expose the first surface and the first indication mark thereof by magnetic attraction of the magnetic float. Moreover, the stop plate of the magnetic element is blocked by the block portion of the fixed base to avoid excessive rotation which would expose the second surface and the second indication mark thereof. Thus, accurate visual indication for a liquid level of a liquid tank can be obtained, which is convenient, practical and efficient in use.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
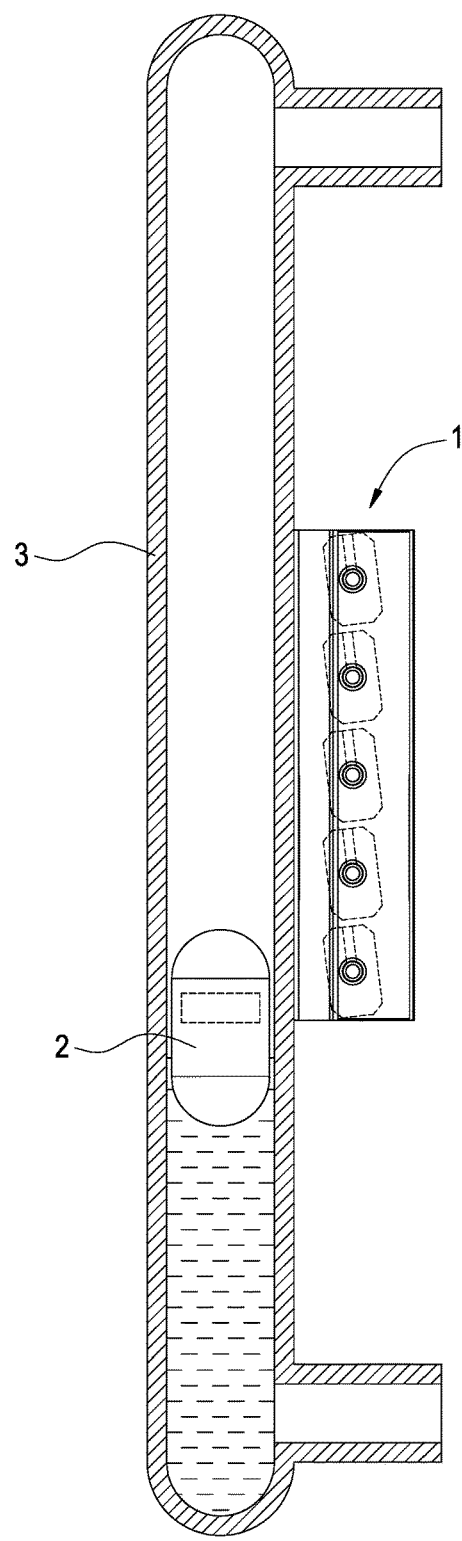
FIG. 1 is a schematic view of the present invention, illustrating a magnetic level indicator in use.

Please refer to FIG. 1 which is a schematic view of the present invention, illustrating a magnetic level indicator in use. The magnetic level indicator 1 collaborates with a magnetic float 2 installed in a hollow pipe 3. The hollow pipe 3 is placed in a liquid tank (not illustrated) at one side thereof and communicates with the liquid tank. The magnetic level indicator 1 is disposed at one side of the hollow pipe 3. When the magnetic float 2 moves along with a liquid level of the liquid tank, the magnetic level indicator 1 operates by magnetic attraction of the magnetic float 2 to show an indication mark to indicate a present liquid level to users. The structure of the magnetic level indicator 1 is detailed below.

Figure 2:
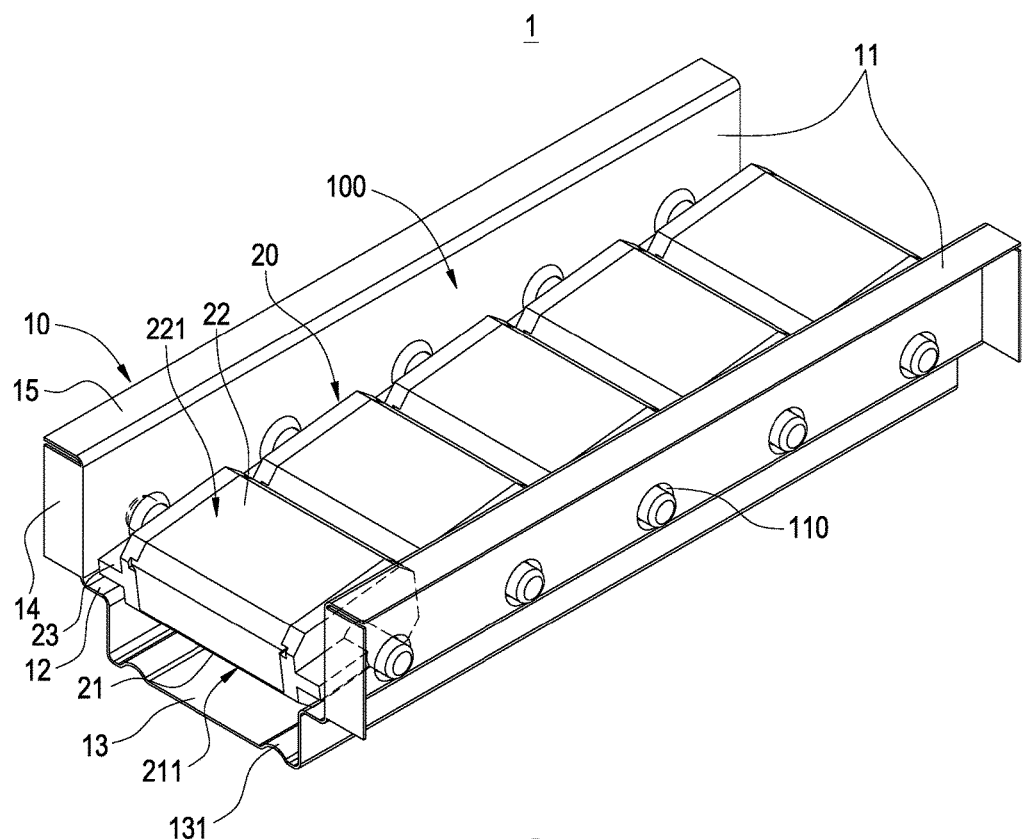
FIG. 2 is a perspective view of the present invention, illustrating the magnetic level indicator.

Please refer to FIG. 2 which is a perspective view of the present invention, illustrating the magnetic level indicator. The magnetic level indicator 1 includes a fixed base 10 and a plurality of magnetic elements 20. The fixed base 10 is preferably a long rectangular base, and the magnetic elements 20 are arranged in a line and are pivotally disposed in the fixed base 10.

In the present embodiment, the fixed base 10 includes two lateral plates 11 corresponding to each other. A block portion 12 extends from a bottom edge of each of the two lateral plates 11, and an installation space 100 is formed between the two lateral plates 11. In detail, the fixed base 10 further includes a support plate 13, the support plate 13 extends in a parallel manner along an extension direction of the lateral plate 11, and the support plate 13 is connected to the block portion 12 of each of the two lateral plates 11. It is preferable that, the support plate 13 includes at least one reinforcement rib 131 for enhancing the strength of the support plate 13.

Moreover, the fixed base 10 further includes a plurality of side plates 14 and a plurality of top plates 15. The side plates 14 extend perpendicularly outward from side edges of the respective two lateral plates 11, and the top plates 15 extend perpendicularly outward from top edges of the respective two lateral plates 11. The fixed base 10 is coupled to one side of the hollow pipe 3 through the side plates 14 and the top plates 15.

Furthermore, the magnetic elements 20 are pivotally disposed in the installation space 100 and are arranged longitudinally along the extension direction of each lateral plate 11. Moreover, each of the magnetic elements 20 includes a first surface 21 and a second surface 22 corresponding to each other, and includes two stop plates 23 disposed corresponding to each other between the first surface 21 and the second surface 22. The first surface 21 includes a first indication mark 211, and the second surface 22 includes a second indication mark 221 different from the first indication mark 211. The first indication mark 211 and the second indication mark 221 appear depending on whether the magnetic elements 20 are magnetically attracted by the magnetic float 2.

For example, referring to FIG. 1, when the magnetic float 2 is close to the magnetic elements 20, each of the magnetic elements 20 is rotated to expose the first surface 21 and the first identification mark 211 thereof by magnetic attraction of the magnetic float 2, and the stop plate 23 of the magnetic element 20 is blocked by the two block portions 12 of the fixed base 10 to prevent the second surface 22 and the second identification mark 221 from being exposed by excessive rotation.

Figure 3:
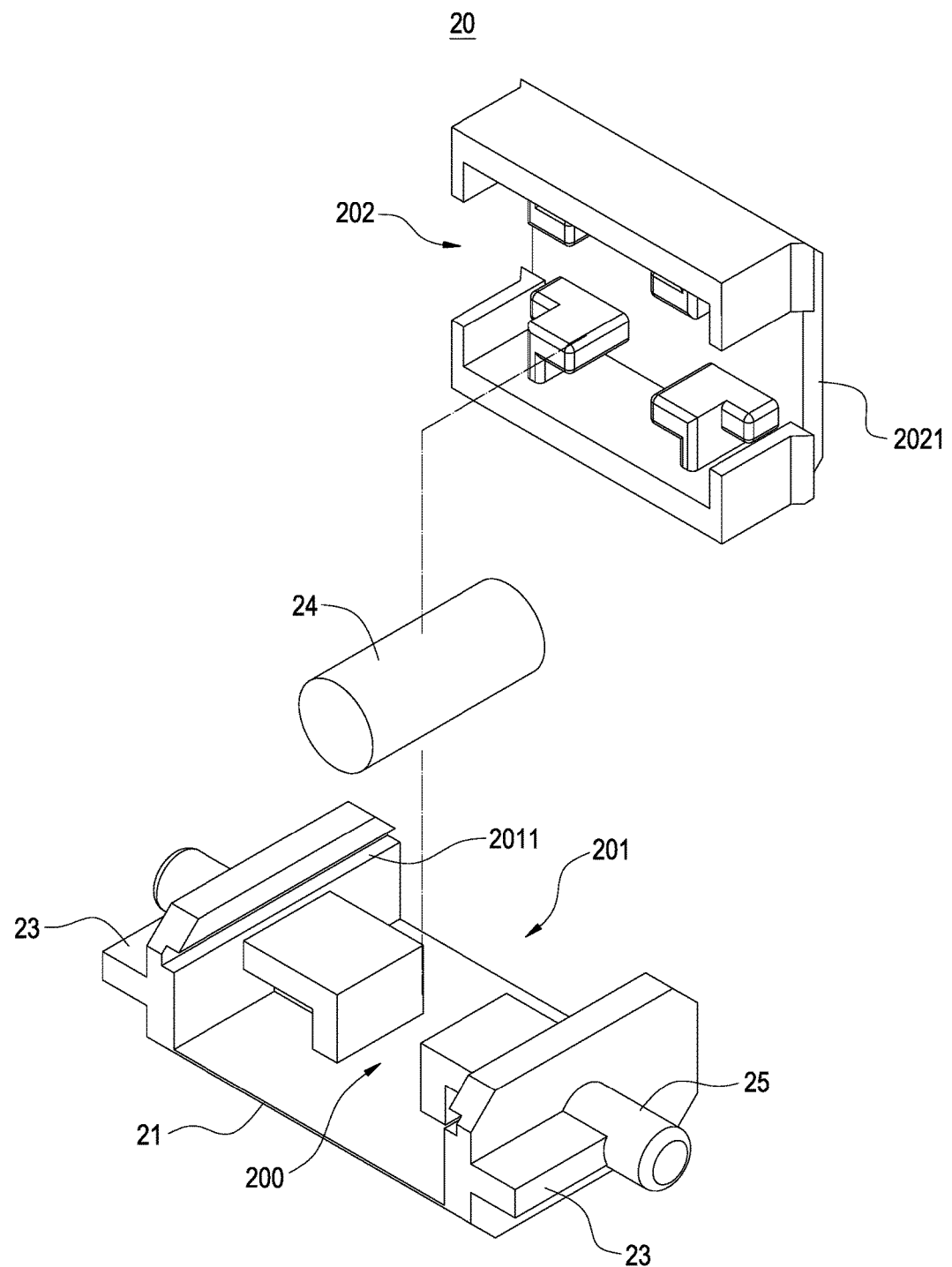
FIG. 3 is a perspective exploded view of the present invention, illustrating a magnetic element.
Figure 4:
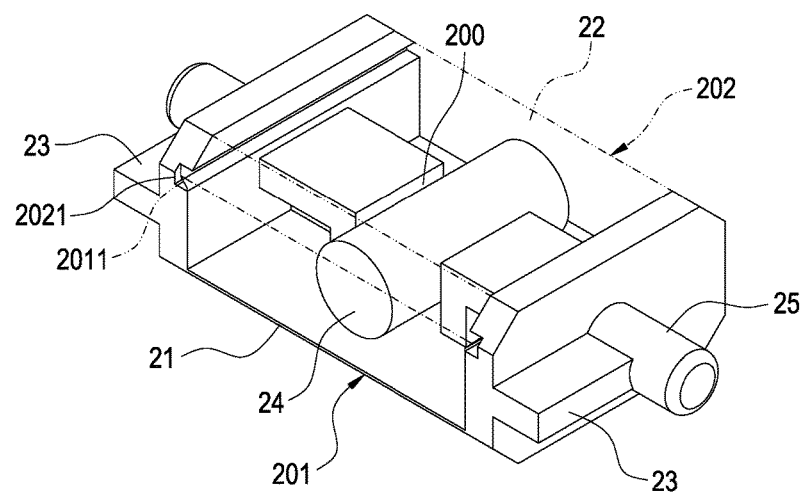
FIG. 4 is a perspective view of the present invention, illustrating the magnetic element.
Figure 5:
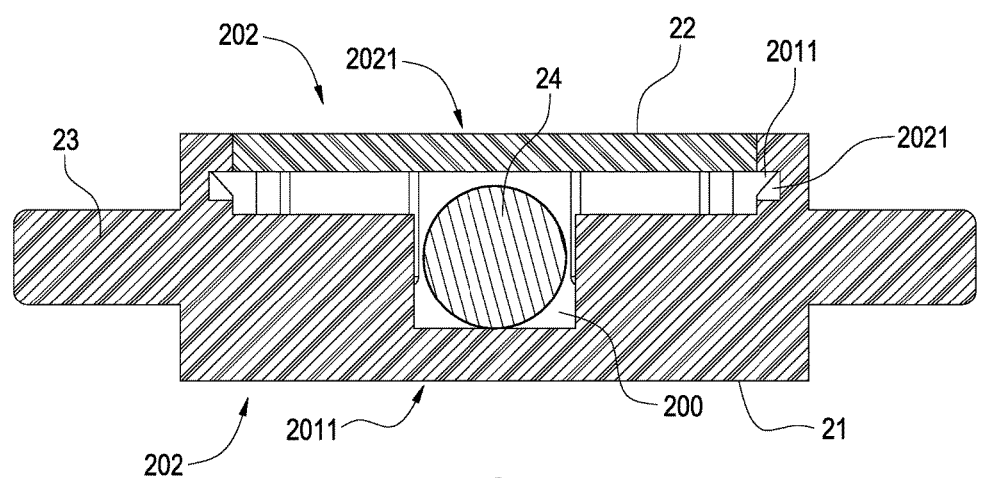
FIG. 5 is a cross-sectional view illustrating the combined magnetic element.

Please refer to FIGS. 3 to 5 which are a perspective exploded view, a perspective view and a cross-sectional view illustrating a magnetic element. As shown in FIG. 3, in one embodiment of the present invention, each of the magnetic elements 20 includes a first base 201 having the first surface 21, a second base 202 having the second surface 22, and a magnet 24. The first base 201 includes a recess 200 inside, the magnet 24 is disposed inside the recess 200, the second base 202 is coupled to the first base 201 to receive and cover the magnet 24.

In the present embodiment, the first base 201 includes two shafts 25 disposed corresponding to each other at two sides of the first base 201, and each of the magnetic elements 20 is assembled inside the installation space 100 by means of the two shafts 25 pivotally disposed in the two lateral plates 11 of the fixed base 10. In the present embodiment, the two lateral plates 11 each include a plurality of pivot holes 110, and the shafts 25 of the magnetic elements 20 are inserted in the pivot holes 110 respectively. Furthermore, the two stop plates 23 of the magnetic element 20 are disposed corresponding to each other at two sides of the first base 201, and the two stop plates 23 are disposed at one side of the two shafts 25. Details of coupling the first base 201 to the second base 202 are described below.

The second base 202 includes two fastening plates 2021 disposed at two sides respectively, two fastening grooves 2011 are disposed at two inner surfaces of the first base 201 respectively, and the two fastening grooves 2011 are disposed respectively corresponding to the two fastening plates 2021 at two sides of the second base 202. The second base 202 is coupled to the first base 201 through engagement (slidable engagement) of the fastening plate 2021 with the fastening groove 2011.

It should be noted that, in the present embodiment, the first base 201 and the second base 202 are made of non-magnetic material. Moreover, the first indication mark 211 and the second indication mark 221 are of different colors. It is preferable that the first indication mark 211 and the second indication mark 221 are fluorescent. In practice, the first indication mark 211 and the second indication mark 221 are not limited to specific colors, and the first indication mark 211 and the second indication mark 221 can be different words or signs.

Figure 6:
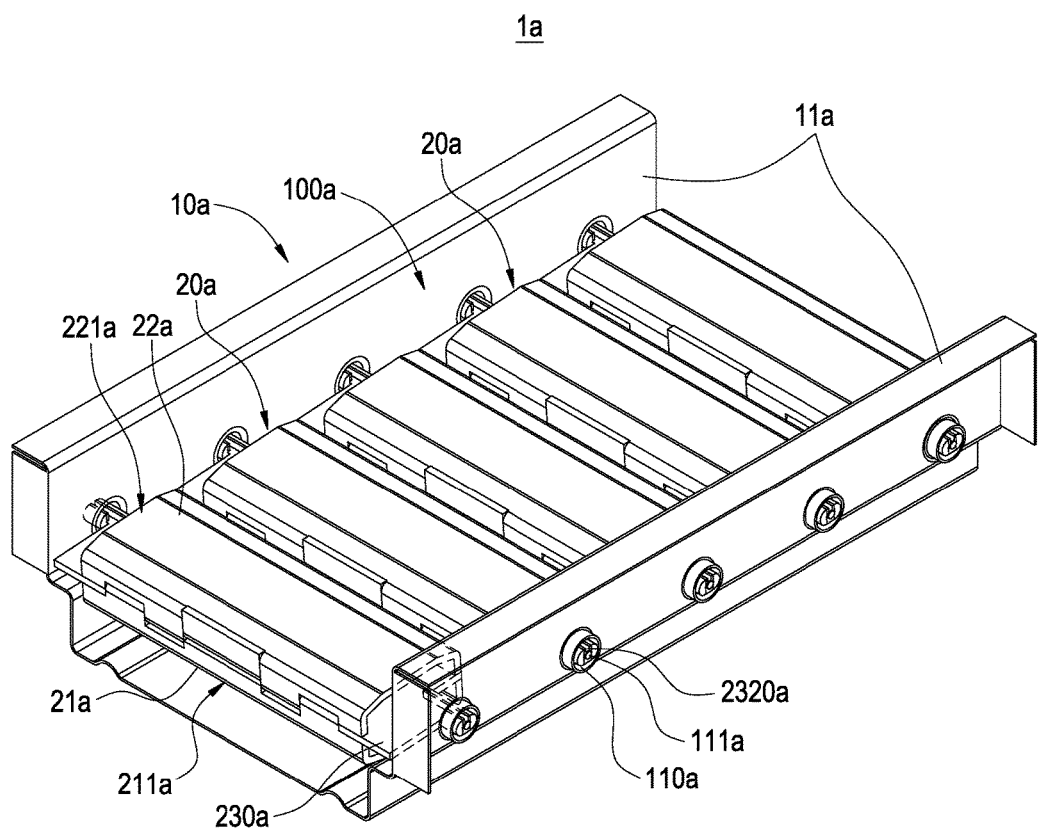
FIG. 6 is a schematic view illustrating the magnetic level indicator according to another embodiment of the present invention.

Please refer to FIG. 6, which is a schematic view illustrating the magnetic level indicator according to another embodiment of the present invention. This embodiment is similar to the previous embodiment. The magnetic level indicator 1a includes a fixed base 10a and a plurality of magnetic elements 20a. The fixed base 10a is a long rectangular base. The fixed base 10a includes two lateral plates 11a corresponding to each other and includes an installation space 100a. The magnetic elements are arranged in a line and are pivotally disposed in the fixed base 10a. Moreover, each of the magnetic elements 20a includes a first surface 21a and a second surface 22a corresponding to each other, and two stop plates 230a disposed corresponding to each other between the first surface 21a and the second surface 22a. The first surface 21a includes a first indication mark 211a, and the second surface 22a includes a second indication mark 221a different from the first indication mark 211a. The present embodiment is different from the previous embodiment in the structure of the magnetic elements 20a.

Figure 7:
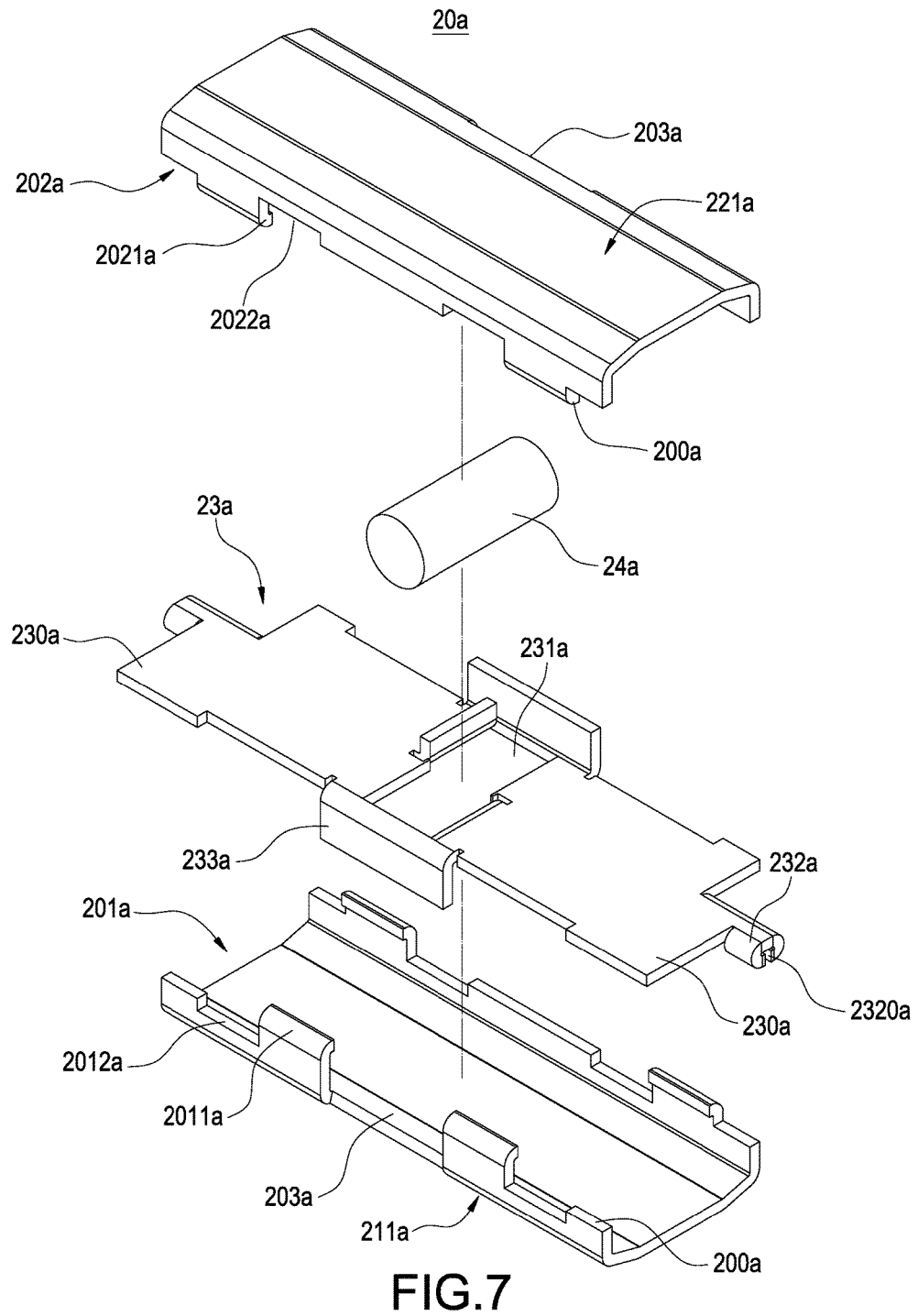
FIG. 7 is a perspective exploded view illustrating the magnetic element according to the another embodiment of the present invention.
Figure 8:
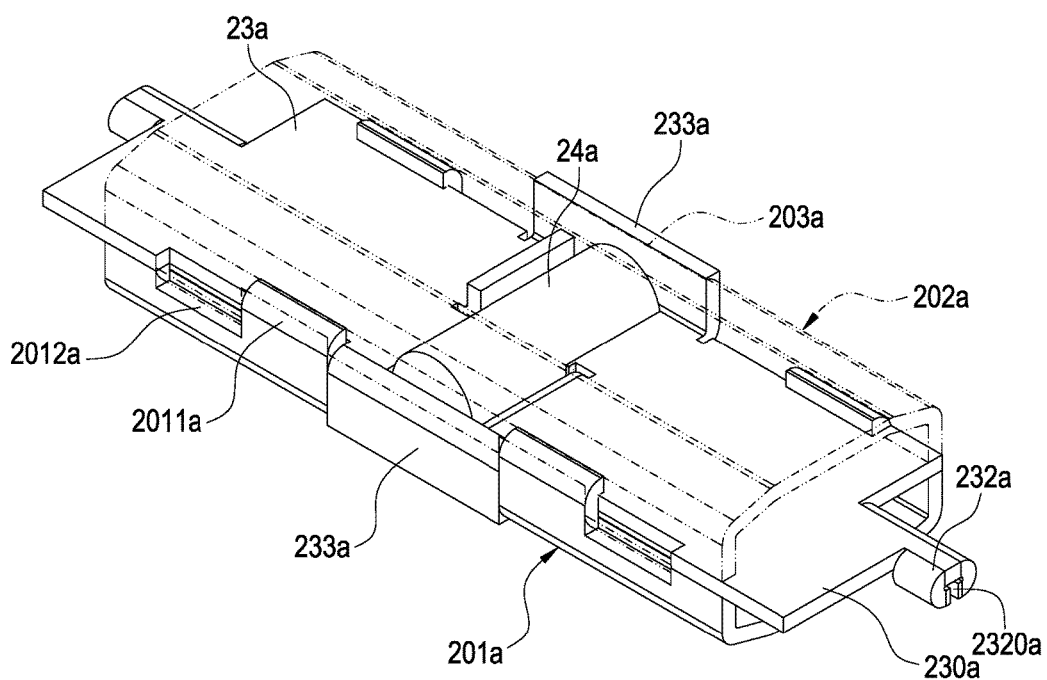
FIG. 8 is a perspective see-through view illustrating the magnetic element according to the another embodiment of the present invention.

Please refer to FIGS. 7 and 8, which are a perspective exploded view and a perspective see-through view illustrating the magnetic element according to the another embodiment of the present invention. As shown in FIG. 7, in the present embodiment, the magnetic element 20a includes a first board 201a having the first surface 21a, a second board 202a having the second surface 22a, a magnet 24a, and a rotation board 23a clamped between the first board 201a and the second board 202a. It is preferable that the first board 201a and the second board 202a are made of nonmagnetic material.

Moreover, the rotation board 23a includes a recess 231a, the magnet 24a is disposed inside the recess 231a, two shafts 232a are disposed corresponding to each other at two sides of the rotation board 23a, and the first board 201a and the second board 202a are coupled to each other to receive and cover the magnet 24a. The magnetic element 20a is assembled inside the installation space 100a by means of the two shafts 232a pivotally disposed in the two lateral plates 11a.

It should be noted that, in the present embodiment, the two lateral plates 11a each include a plurality of pivot holes 110a, and a positioning rib 111a is disposed in each of the pivot holes 110a. Each of the shafts 232a includes a positioning groove 2320a for insertion of the positioning rib 111a. Accordingly, the magnetic element 20a is pivotally rotatable by means of the shaft 232a (the positioning groove 2320a) engaged with the pivot hole 110a (the positioning rib 111a).

It should be noted that, in the present embodiment, the two stop plates 230a is a portion of the rotation board 23a. Furthermore, the two stop plates 230a are disposed corresponding to each other at two sides of the rotation board 23a, and are disposed at one side of the two shafts 232a. Furthermore, the first board 201a and the second board 202a each have a plurality of openings 200a correspondingly disposed at two sides, and the two stop plates 23 are inserted through and exposed from the openings 200a.

In detail, the rotation board 23a includes a plurality of positioning blocks 233a. The first board 201a and the second board 202a include a plurality of positioning recess portions 203a disposed corresponding to the positioning blocks 233a, and the positioning blocks 233a are in contact with the positioning recess portions 203a. The first board 201a includes a plurality of first hooks 2011a and a plurality of first breaches 2012a, and the first board 201a is coupled to the rotation board 23a at one side by means of the first hooks 2011a connected to a side edge of the rotation board 23a.

The second board 202a includes a plurality of second hooks 2021a and a plurality of second breaches 2022a, and the second board 202a is coupled to the rotation board 23a at the other side by means of the second hooks 2021a connected to the side edge of the rotation board 23a. The first breach 2012a receives a portion of the second hook 2021a, and the second breach 2022a receives a portion of the first hook 2011a. Accordingly, the first board 201a is coupled to the second board 202a by the first hooks 2011a engaged with the second breaches 2022a and by the second hooks 2021a engaged with the first breaches 2012a. Therefore, the magnetic element 20a can be constituted to serve as an indication element for the magnetic level indicator 1a.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A magnetic level indicator, collaborating with a magnetic float, comprising:
   a fixed base, the fixed base including two lateral plates corresponding to each other, a block portion extending from a bottom edge of each of the two lateral plates, an installation space being formed between the two lateral plates; and
   a plurality of magnetic elements, the magnetic elements being pivotally disposed in the installation space and being arranged longitudinally along an extension direction of each lateral plate, each of the magnetic elements including a first surface and a second surface corresponding to each other, two stop plates disposed corresponding to each other between the first surface and the second surface, the first surface including a first indication mark, the second surface including a second indication mark different from the first indication mark, wherein when the magnetic float passes the magnetic elements, each magnetic element is rotated to expose the first surface by magnetic attraction of the magnetic float, and the two stop plates are blocked by the two block portions. respectively, to avoid over rotation, thereby preventing the second surface from being exposed by over rotation;
   wherein each of the magnetic elements includes a first base having the first surface, a second base having the second surface, and a magnet, the first base including a recess inside, the magnet is disposed inside the recess, the second base is coupled to the first base to receive and cover the magnet, the first base includes two shafts disposed corresponding to each other at two sides of the first base, and each of the magnetic elements is assembled inside the installation space by the two shafts pivotally disposed in the two lateral plates; the second base includes two fastening plates disposed at two sides respectively, two fastening grooves are disposed at two inner surfaces of the first base respectively, the two fastening grooves are disposed respectively corresponding to the two fastening plates at two sides of the second base, and the second base is coupled to the first base through engagement of the fastening plate with the fastening groove.

2. The magnetic level indicator of claim 1, wherein the fixed base further includes a support plate, and the support plate extends in a parallel manner along the extension direction of each lateral plate and is connected to the block portions of the two lateral plates.

3. The magnetic level indicator of claim 2, wherein the support plate includes at least one reinforcement rib.

4. The magnetic level indicator of claim 1, wherein the fixed base further includes a plurality of side plates, and the side plates extend perpendicularly outward from side edges of the respective two lateral plates.

5. The magnetic level indicator of claim 4, wherein the fixed base further includes a plurality of top plates, and the top plates extend perpendicularly outward from top edges of the respective two lateral plates.

6. The magnetic level indicator of claim 1, wherein the two stop plates are disposed corresponding to each other at two sides of the first base and the two stop plates are disposed at one side of the two shafts.

7. The magnetic level indicator of claim 1, wherein the first indication mark and the second indication mark are of different colors.

8. A magnetic level indicator, collaborating with a magnetic float, comprising:
   a fixed base, the fixed base including two lateral plates corresponding to each other, a block portion extending from a bottom edge of each of the two lateral plates, an installation space being formed between the two lateral plates; and
   a plurality of magnetic elements, the magnetic elements being pivotally disposed in the installation space and being arranged longitudinally along an extension direction of each lateral plate, each of the magnetic elements including a first surface and a second surface corresponding to each other, two stop plates disposed corresponding to each other between the first surface and the second surface, the first surface including a first indication mark, the second surface including a second indication mark different from the first indication mark, wherein when the magnetic float passes the magnetic elements, each magnetic element is rotated to expose the first surface by magnetic attraction of the magnetic float, and the two stop plates are blocked by the two block portions, respectively, to avoid over rotation, thereby preventing the second surface from being exposed by over rotation;
   wherein each of the magnetic elements includes a first board having the first surface, a second board having the second surface, a magnet, and a rotation board clamped between the first board and the second board, the rotation board includes a recess, the magnet is disposed inside the recess, two shafts are disposed corresponding to each other at two sides of the rotation board, the first board and the second board are coupled to each other to receive and cover the magnet, and wherein each of the magnetic elements is assembled inside the installation space by means of the two shafts pivotally disposed in the two lateral plates.

9. The magnetic level indicator of claim 8, wherein the first board includes a plurality of first hooks and a plurality of first breaches, the first board is coupled to the rotation board at one side thereof by means of the first hooks connected to a side edge of the rotation board, the second board includes a plurality of second hooks and a plurality of second breaches, the second board is coupled to the rotation board at the other side thereof by means of the second hooks connected to the side edge of the rotation board, wherein the first breach receives a portion of the second hook, the second breach receives a portion of the first hook, the rotation board includes a plurality of positioning blocks, the first board and the second board include a plurality of positioning recess portions disposed corresponding to the positioning blocks, and the positioning blocks are in contact with the positioning recess portions.

10. The magnetic level indicator of claim 8, wherein the two stop plates are disposed corresponding to each other at two sides of the rotation board, and the two stop plates are disposed corresponding to each other at one side of the two shafts, the first board and the second board each have a plurality of openings correspondingly disposed at two sides, and the two stop plates are inserted through and exposed from the openings.

11. The magnetic level indicator of claim 8, wherein the two lateral plates each include a plurality of pivot holes, the shafts of the magnetic elements are inserted through the pivot holes respectively, a positioning rib is disposed in each of the pivot holes of the two lateral plates, and each of the shafts includes a positioning groove for insertion of the positioning rib.

* * * * *